United States Patent
Bovet et al.

(10) Patent No.: US 12,340,232 B2
(45) Date of Patent: Jun. 24, 2025

(54) SYSTEMS AND METHODS FOR INTEGRATING MOBILE APPLICATION PLUG-INS

(71) Applicant: Salesforce, Inc., San Francisco, CA (US)

(72) Inventors: Jean Elie Bovet, Los Angeles, CA (US); Stephen Goldberg, Frisco, TX (US); Alexander Sikora, Cincinnati, OH (US); Joao Henrique Pimentel Wanderley Neves, San Mateo, CA (US); Nitish Khadiya, Sunnyvale, CA (US); Saket Agarwal, San Mateo, CA (US)

(73) Assignee: Salesforce, Inc., San Francisco, CA (US)

( * ) Notice: Subject to any disclaimer, the term of this patent is extended or adjusted under 35 U.S.C. 154(b) by 400 days.

(21) Appl. No.: 17/091,458

(22) Filed: Nov. 6, 2020

(65) Prior Publication Data
US 2022/0147375 A1 May 12, 2022

(51) Int. Cl.
*G06F 9/445* (2018.01)
*G06F 8/61* (2018.01)
(Continued)

(52) U.S. Cl.
CPC ........... *G06F 9/44526* (2013.01); *G06F 8/61* (2013.01); *G06F 8/65* (2013.01); *G06F 9/541* (2013.01); *G06F 8/62* (2013.01); *G06F 2209/541* (2013.01)

(58) Field of Classification Search
CPC .......... G06F 9/44526; G06F 8/61; G06F 8/65; G06F 9/541; G06F 8/62; G06F 2209/541
See application file for complete search history.

(56) References Cited

U.S. PATENT DOCUMENTS 6,832,223 B1 * 12/2004 Scheifler .................... G06F 9/52
   709/200
8,046,778 B1 * 10/2011 Getlin ........................ G06F 9/54
   719/328

(Continued)

OTHER PUBLICATIONS

The Java™ Tutorials; Creating Extensible Applications; archived Jul. 11, 2019; https://web.archive.org/web/20190711232851/https://docs.oracle.com/javase/tutorial/ext/basics/spi.html; 7 pages (Year: 2019).*

(Continued)

*Primary Examiner* — Kevin L Young
*Assistant Examiner* — Kimberly L Jordan
(74) *Attorney, Agent, or Firm* — Sterne, Kessler, Goldstein & Fox P.L.L.C.

(57) ABSTRACT

The present disclosure is directed to integrating mobile application plug-ins. For example, a method may include: at run-time of a host application, initializing, by the host application, a plurality of plug-ins; in response to initializing the plurality of plug-ins, establishing a set of supported services provided between a plurality of components comprising a native component of the host application and the plurality of plug-ins; detecting a request for a service from a first component of the plurality of components; and in response to determining that the requested service is one of the supported services, routing the requested service to a second component of the plurality of components, the second component being different than the first component.

20 Claims, 4 Drawing Sheets

(51) Int. Cl.
*G06F 8/65* (2018.01)
*G06F 9/54* (2006.01)

(56) References Cited

U.S. PATENT DOCUMENTS

| | | | | |
|---|---|---|---|---|
| 2008/0155405 A1* | 6/2008 | Lock | ............... | G05B 19/042 |
| | | | | 715/700 |
| 2008/0301711 A1* | 12/2008 | Stark | ............... | G06F 8/315 |
| | | | | 719/316 |
| 2009/0024992 A1* | 1/2009 | Kulaga | ............... | H04L 63/20 |
| | | | | 717/177 |
| 2017/0365009 A1* | 12/2017 | Chen | ............... | G06Q 40/12 |
| 2018/0075231 A1* | 3/2018 | Subramanian | ......... | G06F 16/86 |

OTHER PUBLICATIONS

Spring Framework Documentation—Core Technologies; https://docs.spring.io/spring-framework/docs/5.2.0.RELEASE/spring-framework-reference/core.html; Sep. 30, 2019; 282 pages (Year: 2019).*

Martin Fowler; Inversion of Control Containers and the Dependency Injection pattern; https://martinfowler.com/articles/injection.html; Jan. 23, 2004; 30 pages (Year: 2004).*

Decouple Your Code With Dependency Injection; https://belief-driven-design.com/decouple-your-code-with-dependency-injection-77b8d39cc93/; Feb. 25, 2020 (Year: 2020).*

John et al.; Plux.NET—A Dynamic Plug-in Platform for Desktop and Web Applications in .NET; 2012; 18 pages (Year: 2012).*

Reinhard Wolfinger; Dynamic Application Composition with Plux.NET; Jan. 2010; 157 pages (Year: 2010).*

\* cited by examiner

SYSTEMS AND METHODS FOR INTEGRATING MOBILE APPLICATION PLUG-INS

BACKGROUND

Mobile applications include preprogrammed components that are specifically designed to operate on the application. As components are developed for a new application, developers may recognize that some of the services provided by these new components may be useful in other, pre-existing applications. Likewise, developers may recognize that existing components may be useful while developing a new application. Even further, some developers may identify services lacking in existing applications and may develop new components to remedy these shortcomings However, integrating components from one application to another or adding new components to existing applications may be costly, time consuming, and degrade a user experience.

Thus, there is a need to provide a way to integrate new components or cross-integrate components between different applications.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to an ecosystem for incorporating new components into a mobile application operating on a client device. The ecosystem includes a combination of two pieces. First, on the client device, the ecosystem may include a system design kit (SDK) that includes a set of native client libraries that support retrieving, caching, priming, and providing offline support for components hosted on a server. In some embodiments, native components may be exposed to web components using a bridging framework. The SDK may include new libraries, as well as code for authorizing, managing web views, and navigation that will be extracted from the application operating on the client device. Second, on a server, the ecosystem may include a component that serves as a container for hosting the components.

In some embodiments, the ecosystem provides for techniques for integrating new components into a host application without degrading device security, user experiences, testability, debugging, performance, rapid release, and developer productivity. For example, the present disclosure advantageously provides for integrating new components or updating existing components without impacting a user of the host application. Additionally, the present disclosure advantageously provides for isolation between the host application and the plug-ins, such that the host application is aware of the services provided by each plug-in without any knowledge as to how the plug-in provides such services, and vice-versa. Additionally, this isolation allows the host application to leverage these interfaces to provide full isolation to plug-ins. Additionally, the present disclosure allows for any one of the plug-ins to be deactivated at any time without interfering with the operations of the host application.

Figure 1:
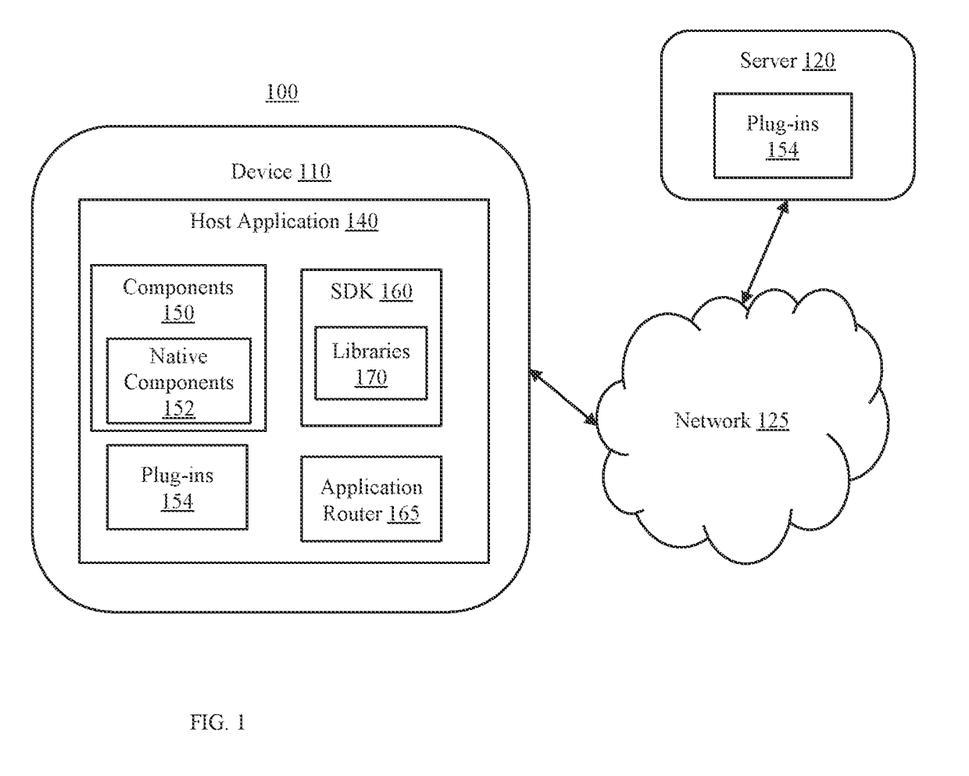
FIG. 1 is a block diagram of a system, according to some example embodiments.

FIG. 1 is a diagram of an example environment 100 in which example systems and/or methods may be implemented. As shown in FIG. 1, environment 100 may include a device 110, a server 120, and a network 125. Devices of the environment 100 may interconnect via wired connections, wireless connections, or a combination of wired and wireless connections. Devices of environment 100 may include a computer system 500 shown in FIG. 5, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the device 110 may be, for example, a mobile phone (e.g., a smart phone, a radiotelephone, etc.), a handheld computer, tablet, a laptop, a gaming device, a wearable communication device (e.g., a smart wristwatch, a pair of smart eyeglasses, etc.), or a similar type of device that is configured to operate an application, such as a host application 140 described herein.

The server 120 may include a server device (e.g., a host server, a web server, an application server, etc.), a data center device, or a similar device, capable of communicating with the computing device 110 via the network 125. The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, the server 120 may store a plurality of plug-ins 154 that may be added to or removed from the host application 140. For example, the plurality of plug-ins 154 may be added to the host application 140 by downloading the plurality of plug-ins 154 at the device 110 from the server 120 over the network 125, as should be understood by those of ordinary skill in the art. Additionally, the plurality of plug-ins 154 may be removed from the device 110 by uninstalling the plurality of plug-ins 154 from the client device 110. In some embodiments, the plurality of plug-ins 154 may include native components and/or web components.

In some embodiments, host application 140 may include a plurality of components 150 that may include one or more of a plurality of native components 152. The host application 140 may also include one or more of the plurality of plug-ins 154. In some embodiments, the one or more of the plurality of plug-ins 154 may be directly added to the host application 140 via the client device 110, rather than being downloaded from the server 120. In some embodiments, the one or more of the plurality of plug-ins 154 may be assembled into the host application 140 at build time of, i.e., a developer may add the one or more of the plurality of plug-ins 154 to the host application 140 while developing the host application 140.

In some embodiments, one or more of the native components 152 and/or one or more of the plurality of plug-ins 154 may be enabled and disabled at either the server 120 or on the device 110. For example, a developer using the device 110 may enable/disable one or more of the native components 152 and/or one or more of the plurality of plug-ins 154 via a user interface on the device 110 or a user interface on the server 120. In some embodiments, when the one or more of the native components 152 and/or the one or more of the plurality of plug-ins 154 are disabled at the server 120, the server 120 may notify the host application 140 on the client device 110 that the one or more of the plurality of native components 152 and/or the one or more of the plurality of plug-ins 154 has been enabled/disabled.

In some embodiments, the host application 140 may include a system design kit (SDK) 160 and an application router 165. In some embodiments, the SDK 160 and the application router 165 may operate in conjunction with one another to execute an agnostic routing grammar, as described in U.S. patent application Ser. No. 17/091,452, titled "Systems And Methods Dynamically Routing An Event To A Component Of A Hybrid Application," the contents of which are hereby incorporated by reference in their entirety.

Figure 2:
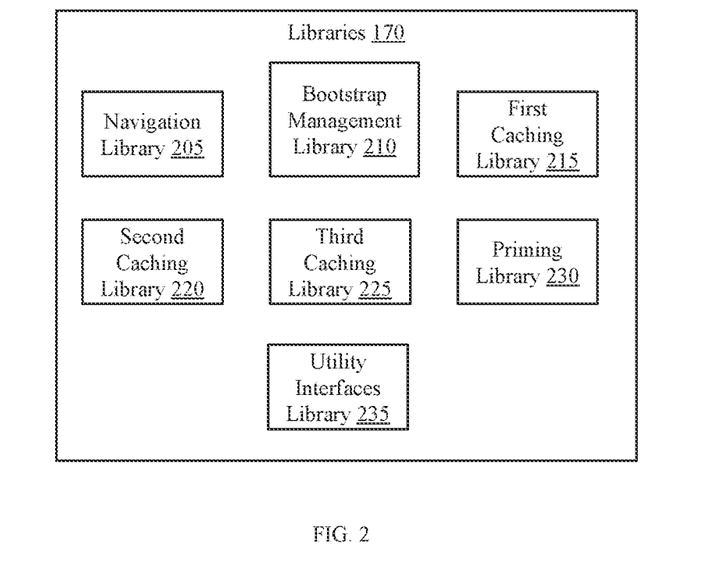
FIG. 2 is a block diagram of a plurality of libraries of a system design kit (SDK), according to some example embodiments.

In some embodiments, the SDK 160 may include a plurality of libraries 170. For example, as shown in FIG. 2, the plurality of libraries 170 include a include navigation library 205 that provides for web view management and navigation handling, a bootstrap management library 210 that provides for the retrieval and caching of host pages and bootstrap management, a first caching library 215 that provides for data caching with native requests and storage, a second caching library 220 that provides for component definition retrieval and caching, a third caching library 225 that provides for caching and injection of resources, a priming library 230 that provides for the ability to prime specific modules, and a utility interfaces library 235 that provides for utility interfaces and allows for plugging in different network and storage implementations. It should be understood by those of ordinary skill in the arts that these are merely some examples of libraries and that other libraries are further contemplated in accordance with aspects of the present disclosure.

Figure 3:
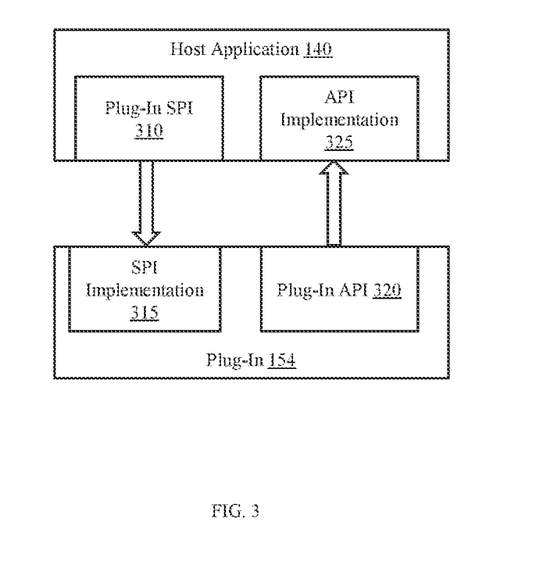
FIG. 3 is a block diagram of a mobile application, according to some example embodiments.

As illustrated in FIG. 3, the host application 140 may include a plug-in service provider interface (SPI) 310 and each of the plurality of plug-ins 154 may include an SPI implementation 315. As further illustrated in FIG. 3, each of the plug-ins 154 may include a plug-in application programming interface (API) 320 and the host application 140 may include an API implementation 325.

In some embodiments, at run-time, the host application 140 may initialize each of the plurality of plug-ins 154. For example, for each of the plurality of plug-ins 154, the host application 140 communicate with each of the plurality of plug-ins 154 using the plug-in SPI 310 and the SPI implementation 315. In some embodiments, the host application 140 may inject the plug-in API 320 into each of the plurality of plug-ins 154. In response, each of the plurality of plug-ins 154 may incorporate the plug-in API 320 into its existing code. In this way, the host application 140 may incorporate any new plug-ins 154 that were added to the host application 140 or updated while the host application 140 was offline.

Thus, in some embodiments, the host application 140 may manage each of the plurality of plug-ins 154. For example, one or more plug-ins may be added or removed from the plurality of plug-ins 154 at any time, and as such, the host application 140 may maintain a list of active plug-ins. In some embodiments, the list of active plug-ins may be stored in a library, such as a navigation library 305, discussed in greater detail below with respect to FIG. 3. Thus, in some embodiments, managing the plurality of plug-ins 154 may include incorporating new plug-ins upon initialization of the host application 140. As a result of the foregoing, the plurality of plug-ins 154 may be added to different host applications 140 with limited costs. For example, as plug-ins 154 are developed, these plug-ins 154 may be integrated into the host application 140 without changing any of the existing coding of the host application 140, which nearly eliminates any costs associated with updating the host application 140.

Additionally, managing the plurality of plug-ins 154 may also include receiving an update to an existing plug-in of the plurality of plug-ins 154 and modifying a pointer of the updated plug-in. That is, in some embodiments, when one of the plurality of plug-ins 154 is updated, the server 120 may provide the update to the host application 140 along with a pointer indicating which version of the plug-in to be utilized by the host application 140. Thus, developers of the plurality of plug-ins 154 and the host application 140 may operate independent of one another, such that modifications to, as well as testing/debugging of, the plurality of plug-ins 154 may be executed external to the host application 140.

In some embodiments, by injecting the plug-in API 320 at run-time, each of the plurality of plug-ins 154 may be able to interact with the host application 140 based on an operating version of the SDK 160 of the host application 140 or based on the type of the host application 140. For example, in some embodiments, the host application 140 may operate on different versions of the SDK 160, and the host application may inject the plug-in API 320 that is specific to the version of the SDK 160 operating on the host application 140. In this way, each of the plurality of plug-ins 154 may be installed on and communicate with the host application 140 regardless of the operating version of the SDK 160. Similarly, each of the plurality of plug-ins 154 may be installed on different host applications 140, and the host application may inject the plug-in API 320 into each of the plurality of plug-ins 154 that is specific to type of the host application 140.

In some embodiments, in response to initializing the plurality of plug-ins, the host application 140 may establish a set of supported services. For example, the set of supported services may be services provided the plurality of native components 152 and the plurality of plug-ins 154. That is, the host application 140 may establish a bi-directional contract between the host application 140 and the plurality of plug-ins 154. This may be achieved using the plug-in SPI 310, the SPI implementation 315, the plug-in API, and the API implementation 325.

In some embodiments, each of the plurality of plug-ins 154 may communicate the services provided therein using the SPI implementation 315 and the plug-in SPI 310, and the host application 140 may communicate the services provided therein using the API implementation 325 and the plug-in API 320. That is, using these interfaces, the host application 140 and each of the plurality of plug-ins 154 may communicate to one another the specified services that each will provide to the other without exposing how such services will be provided. Thus, the techniques described herein advantageously enable the host application 140 and the plurality of plug-ins 154 to provide services to one another while protecting any propriety information as to how such services are executed, i.e., any propriety information of the host application 140 and the plurality of plug-ins 154 is isolated from the other.

In some embodiments, the supported services provided by the native component 152 of the host application 140 may include, but are not limited to, networking, logging, storage, user management, instrumentation, navigation, or the like. In some embodiments, the supported services provided by the plurality of plug-ins 154 may vary from plug-in to plug-in based on the specific function(s) of each respective plug-in 154. For example, one plug-in may be used to provide a collection of key-value pairs where each unique key maps to a single value. As another example, another plug-in may be used connect data from multiple sources, create interactive views of that data, and share those views in the hosting application 140. It should be understood by those of ordinary skill in the art that these are merely examples of plug-ins, and that other plug-ins are further contemplated in accordance with aspects of the present disclosure.

By establishing the bi-directional contract between the host application 140 and the plurality of plug-ins 154, the plurality of plug-ins 154 may function as though they are native to the host application 140, i.e., code that is downloaded and installed when installing the host application 140 on the device 110. Furthermore, by negotiating the set of supported services at run-time, as new plug-ins 154 are developed and added to the host application 140 or changes are made to existing plug-ins 154, the host application 140 may dynamically update the services provided by the plurality of plug-ins 154.

In some embodiments, the plug-in SPI 310 and SPI implementation 315 may enable each of the plurality of plug-ins 154 to expose its services to the host application 140 at run-time of the host application 140, i.e., these services are not statically defined. In some embodiments, the plug-in API 320 and API implementation 325 may enable the host application 140 to expose its services to each of the plurality of plug-ins 154. This exchange of services may be achieved by defining a construct representing a service definition. For example, the construct may include meta-data such as, but not limited to, a service name, a return type, a number of parameters, and parameter types. In response, the host application 140 and/or the plurality of plug-ins 154 may use this information to build the construct. In some embodiments, these constructs define boundaries between the host application 140 and the plurality of plug-ins, such that the host application 140 and the plurality of plug-ins 154 have cross-access to features that are defined in the bi-directional contract, whereas any features that are not defined in the bi-directional contract are inaccessible.

In some embodiments, the host application 140 may detect a request for a service from one of the plurality of plug-ins 154 or the one of the plurality of native components 152. For example, one of the plurality of plug-ins 154 may request a service provided by one of the plurality of native components, e.g., a network request. This request may be transmitted to the host application 140 using the plug-in API 320. As another example, one of the plurality of plug-ins 154 may transmit a request for a service provide by a different one of the plurality of plug-ins 154. Similarly, this request may be transmitted to the host application 140 using the plug-in API 320. In yet another example, one of the plurality of native components 152 may request a service provided by one or more of the plurality of plug-ins 154.

In some embodiments, the host application 140 may determine whether the requested service is from among the set of supported services. For example, the host application 140 may determine whether the request service is a service provided by one of the native components 152 or one of the services provided by one of the plurality of plug-ins 154 in accordance with the bi-directional contract.

In some embodiments, in response to determining that the requested service is one of the supported services, the host application 140 may route the requested service to one or more of non-requesting ones of the plurality of native components 152 and/or the plurality of the plug-ins 154. For example, in some embodiments, in response to receiving a request from one of the plurality of plug-ins 154, the host application 140 may send an inquiry to each non-requesting plug-in 154 using the plug-in SPI 310 and/or the plurality of native components 152. In some embodiments, one of the plurality of native components 152 may request a service, and the host application may send an inquiry using the plug-in SPI 310 to each of the plurality of plug-ins 154 and/or to one or more of non-requesting ones of the plurality of native components 152.

In some embodiments, in response to the inquiry, the plurality of plug-ins 154 may respond to the inquiry using the SPI implementation 315 and/or the plurality of native components 152 may respond within the host application 140. The responses from the plurality of native components 152 and/or the plurality of the plug-ins 154 may include an indication as to whether or not the plurality of native components 152 and/or the plurality of the plug-ins 154 can execute the request. In some embodiments, when the request from one of the plurality of plug-ins 154 is for a service provided by one of the plurality of native components 152, the host application 140 may intercept and route the request the request to one or more of the plurality of native components 152 using the API implementation 335, which may then execute the request. In some embodiments, the host application 140 may return a response to the request back to the requesting plug-in 154 using the plug-in API 220. Thus, the requesting plug-in 154 does not communicate directly with the native component 152 that executed the request.

In some embodiments, based on the responses from the host application 140 the plurality of native components 152 and/or the plurality of the plug-ins 154 may determine which one of the plurality of native components 152 and/or the plurality of the plug-ins 154 to assign the request to, as described in U.S. patent application Ser. No. 17/091,452, titled "Systems And Methods Dynamically Routing An Event To A Component Of A Hybrid Application," the contents of which are hereby incorporated by reference in their entirety.

Figure 4:
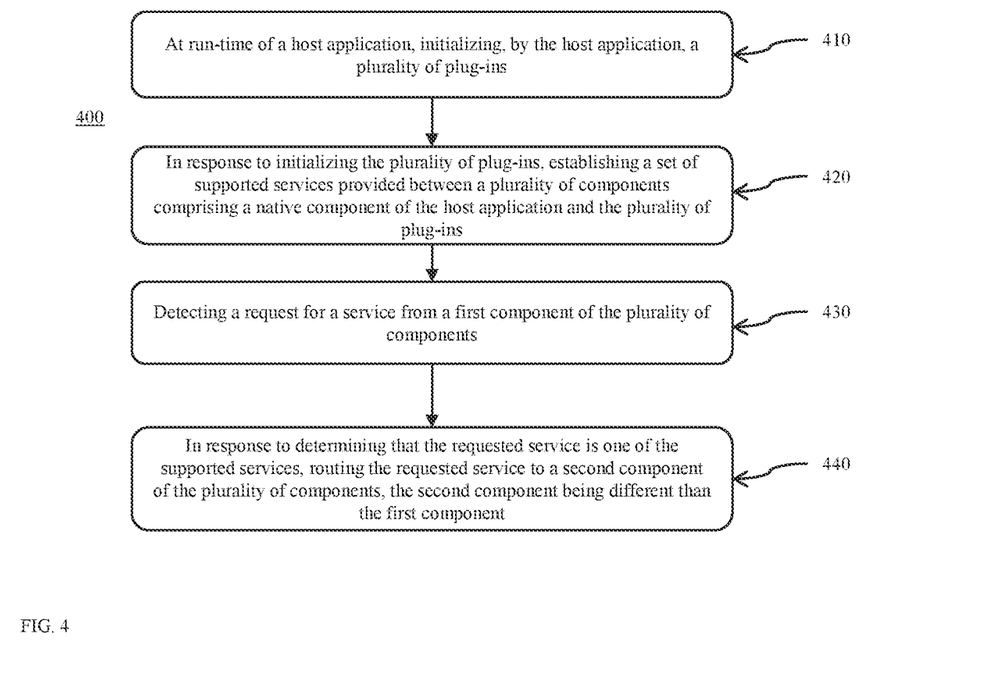
FIG. 4 is a flowchart illustrating a process for integrating mobile application plug-ins, according to some example embodiments.

FIG. 4 is a flow chart of an example method 400 for dynamically routing an event. In some embodiments, one or more processes described with respect to FIG. 4 may be performed by the device 110 of FIG. 1.

At 410, the method 400 may include at run-time of a host application, e.g., host application 140 of FIG. 1, initializing, by the host application, a plurality of plug-ins, e.g., the plurality of plug-ins 154 of FIG. 1. For example, initializing the plurality of plug-ins may include injecting a plug-in API, e.g., plug-in API 320 of FIG. 3, into each of the plurality of plug-ins 154 to enable each of the plurality of plug-ins 154 to communicate with host application 140.

At 420, the method 400 may include, in response to initializing the plurality of plug-ins, establishing a set of supported services provided between a plurality of components comprising a native component of the host application and the plurality of plug-ins. For example, the set of supported services may be services provided one or more native components, e.g., the plurality of native components 152 of FIG. 1, and the plurality of plug-ins 154.

At 430, the method 400 may include detecting a request for a service from a first component of the plurality of components. For example, the host application 140 may detect a request for a service from one of the plurality of plug-ins 154 or the one of the plurality of native components 152 of the host application 140.

At 440, the method 400 may include, in response to determining that the requested service is one of the supported services, routing the requested service to a second component of the plurality of components, the second component being different than the first component. For example, the host application 140 may route the requested service to one or more of non-requesting ones of the plurality of native components 152 and/or the plurality of the plug-ins 154.

Figure 5:
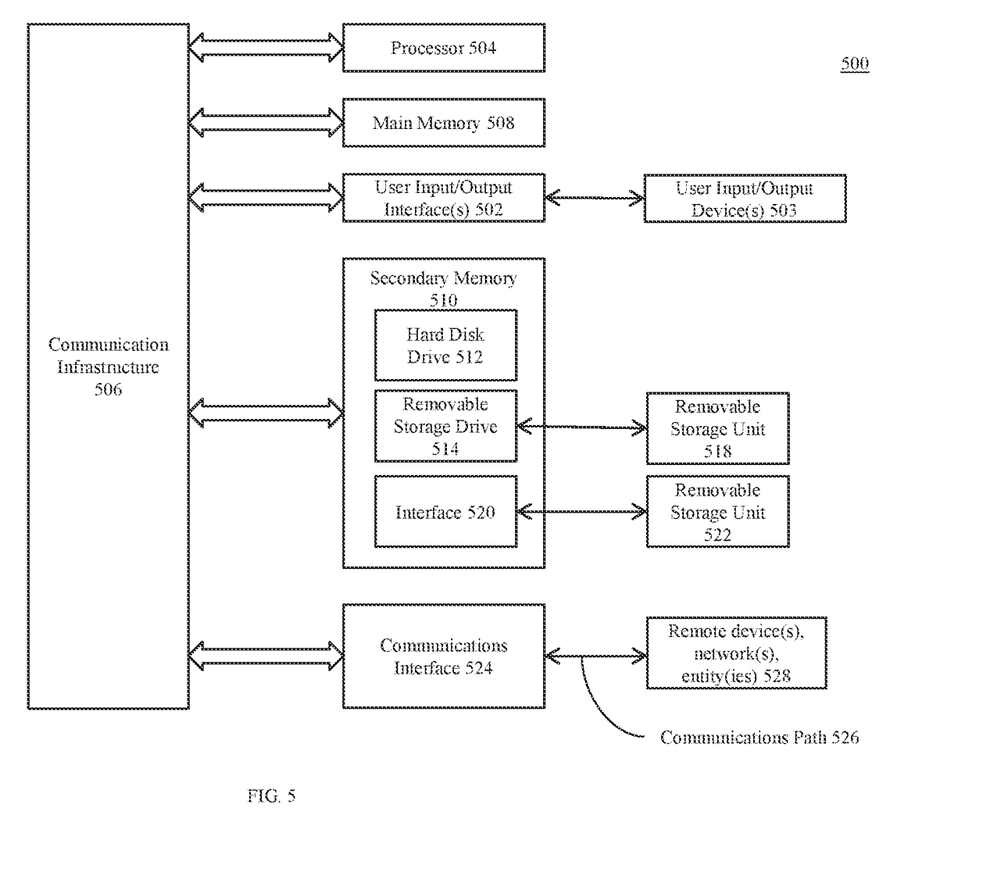
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method, comprising:
   at run-time of a host application, initializing, by the host application, a plurality of plug-ins, wherein:
   the host application comprises a native component and communicates services of the host application to the plurality of plug-ins with a plug-in service provider interface (SPI);
   the host application injects at run-time a plug-in application programming interface (API) that is specific to a type of the host application into one or more of the plurality of plug-ins; and
   the one or more of the plurality of plug-ins communicates services of the one or more of the plurality of plug-ins to the host application with the plug-in API;
   in response to initializing the plurality of plug-ins, establishing, during run-time of the host application, a bi-directional contract between the host application and the plurality of plug-ins with the plug-in SPI and the plug-in API, wherein the bi-directional contract defines a set of supported services requested and cross-accessed by a plurality of components comprising the native component of the host application and the plurality of plug-ins;
   detecting a request for a service from a first component of the native component and the plurality of plug-ins; and
   in response to determining that the requested service is one of the supported services, routing the requested service to a second component of the native component and the plurality of plug-ins, the second component being different than the first component.

2. The method of claim 1, further comprising:
   transmitting a query to each of the plurality of components to determine which of the plurality of components can provide the requested service; and
   selecting the second component based on responses from the plurality of components in response to the query.

3. The method of claim 1, wherein the one or more of the plurality of plug-ins comprise an SPI implementation and the host application communicates services of the host application to the SPI implementation of the one or more of the plurality of plug-ins.

4. The method of claim 1, further comprising integrating a new plug-in into the plurality of plug-ins in response to the new plug-in being installed.

5. The method of claim 1, further comprising receiving an update to a first plug-in of the plurality of plug-ins and modifying a pointer of the first plug-in.

6. The method of claim 1, wherein the first component of the plurality of components is the native component, and wherein routing the requested service to the second component of the plurality of components comprises routing the requested service to the plurality of plug-ins.

7. The method of claim 1, wherein the first component of the plurality of components is one of the plurality of plug-ins, and wherein routing the requested service to the second component of the plurality of components comprises routing the requested service to the native component.

8. A device, comprising:
   a memory; and
   a processor coupled to the memory and configured to:
   at run-time of a host application, initialize, using the host application, a plurality of plug-ins, wherein:
   the host application comprises a native component and communicates services of the host application to the plurality of plug-ins with a plug-in service provider interface (SPI);
   the host application injects at run-time a plug-in application programming interface (API) that is specific to a type of the host application into one or more of the plurality of plug-ins; and
   the one or more of the plurality of plug-ins communicates services of the one or more of the plurality of plug-ins to the host application with the plug-in API;
   in response to initializing the plurality of plug-ins, establish, during run-time of the host application, a bi-directional contract between the host application and the plurality of plug-ins with the plug-in SPI and the plug-in API, wherein the bi-directional contract defines a set of supported services requested and cross-accessed by a plurality of components comprising the native component of the host application and the plurality of plug-ins;

detect a request for a service from a first component of the native component and the plurality of plug-ins; and in response to determining that the requested service is one of the supported services, route the requested service to a second component of the native component and the plurality of plug-ins, the second component being different than the first component.

9. The device of claim 8, wherein the processor is further configured to:

transmit a query to each of the plurality of components to determine which of the plurality of components can provide the requested service; and select the second component based on responses from the plurality of components in response to the query.

10. The device of claim 8, wherein the one or more of the plurality of plug-ins comprise an SPI implementation and the host application communicates services of the host application to the SPI implementation of the one or more of the plurality of plug-ins.

11. The device of claim 8, wherein the processor is further configured to integrate a new plug-in into the plurality of plug-ins in response to the new plug-in being installed.

12. The device of claim 8, wherein the processor is further configured to receive an update to a first plug-in of the plurality of plug-ins and modify a pointer of the first plug-in.

13. The device of claim 8, wherein the first component of the plurality of components is the native component, and wherein, to route the requested service to the second component of the plurality of components comprises, the processor is further configured to route the requested service to the plurality of plug-ins.

14. The device of claim 8, wherein the first component of the plurality of components is one of the plurality of plug-ins, and wherein, to route the requested service to the second component of the plurality of components, the processor is further configured to route the requested service to the native component.

15. A non-transitory computer-readable device having instructions stored thereon that, when executed by at least one computing device, cause the at least one computing device to perform operations comprising:

at run-time of a host application, initializing, by the host application, a plurality of plug-ins, wherein:

the host application comprises a native component and communicates services of the host application to the plurality of plug-ins with a plug-in service provider interface (SPI);

the host application injects at run-time a plug-in application programming interface (API) that is specific to a type of the host application into one or more of the plurality of plug-ins; and the one or more of the plurality of plug-ins communicates services of the one or more of the plurality of plug-ins to the host application with the plug-in API;

in response to initializing the plurality of plug-ins, establishing, during run-time of the host application, a bi-directional contract between the host application and the plurality of plug-ins with the plug-in SPI and the plug-in API, wherein the bi-directional contract defines a set of supported services requested and cross-accessed by a plurality of components comprising the native component of the host application and the plurality of plug-ins;

detecting a request for a service from a first component of the native component and the plurality of plug-ins; and in response to determining that the requested service is one of the supported services, routing the requested service to a second component of the native component and the plurality of plug-ins, the second component being different than the first component.

16. The non-transitory computer-readable device of claim 15, wherein the operations further comprise:

transmitting a query to each of the plurality of components to determine which of the plurality of components can provide the requested service; and selecting the second component based on responses from the plurality of components in response to the query.

17. The non-transitory computer-readable device of claim 15, wherein the one or more of the plurality of plug-ins comprise an SPI implementation and the host application communicates services of the host application to the SPI implementation of the one or more of the plurality of plug-ins.

18. The non-transitory computer-readable device of claim 15, wherein the operations further comprise receiving an update to a first plug-in of the plurality of plug-ins and modifying a pointer of the first plug-in.

19. The non-transitory computer-readable device of claim 15, wherein the first component of the plurality of components is the native component, and wherein routing the requested service to the second component of the plurality of components comprises routing the requested service to the plurality of plug-ins.

20. The non-transitory computer-readable device of claim 15, wherein the first component of the plurality of components is one of the plurality of plug-ins, and wherein routing the requested service to the second component of the plurality of components comprises routing the requested service to the native component.

* * * * *